(12) United States Patent
Johnson

(10) Patent No.: US 8,360,109 B2
(45) Date of Patent: Jan. 29, 2013

(54) ADJUSTABLE BENT HOUSING WITH ROTATIONAL STOP

(76) Inventor: Orren S. Johnson, Edmonton (CA)

( * ) Notice: Subject to any disclaimer, the term of this patent is extended or adjusted under 35 U.S.C. 154(b) by 622 days.

(21) Appl. No.: 12/559,842

(22) Filed: Sep. 15, 2009

(65) Prior Publication Data

US 2010/0065143 A1  Mar. 18, 2010

(30) Foreign Application Priority Data

Sep. 15, 2008  (CA) ..................................... 2639679

(51) Int. Cl.
*F16L 11/00* (2006.01)

(52) U.S. Cl. ...... 138/120; 138/155; 285/184; 166/242.6

(58) Field of Classification Search .................. 138/120, 138/155; 285/184; 166/242.6
See application file for complete search history.

(56) References Cited

U.S. PATENT DOCUMENTS

| | | | |
|---|---|---|---|
| 1,349,060 A * | 8/1920 | Gall et al. | 285/146.3 |
| 1,774,986 A * | 9/1930 | Mackenzie | 285/280 |
| 1,850,403 A | 3/1932 | Lee | |
| 2,696,264 A * | 12/1954 | Colmerauer et al. | 166/235 |
| 3,443,758 A * | 5/1969 | Kopp et al. | 239/265.35 |
| 3,586,116 A | 6/1971 | Tiraspolsky | |
| 3,717,208 A | 2/1973 | Anderson | |
| 4,067,404 A | 1/1978 | Crase | |
| 4,077,657 A | 3/1978 | Trzeciak | |
| 4,220,214 A | 9/1980 | Benoit | |
| 4,258,800 A | 3/1981 | Hipp | |
| 4,286,676 A | 9/1981 | Nguyen | |
| 4,303,135 A | 12/1981 | Benoit | |
| 4,596,294 A | 6/1986 | Russell | |
| 4,745,982 A | 5/1988 | Wenzel | |
| 4,811,798 A | 3/1989 | Falgout, Sr. | |
| 4,813,497 A | 3/1989 | Wenzel | |
| 4,817,740 A | 4/1989 | Beimgraben | |
| 4,843,945 A | 7/1989 | Dinsdale | |
| 4,848,490 A | 7/1989 | Anderson | |
| 4,913,466 A | 4/1990 | Becker | |
| 5,048,621 A | 9/1991 | Bailey | |
| 5,052,501 A | 10/1991 | Wenzel | |
| 5,101,914 A | 4/1992 | Wenzel | |
| 5,101,915 A | 4/1992 | Witte | |
| 5,269,385 A | 12/1993 | Sihlis | |
| 5,343,966 A | 9/1994 | Wenzel | |
| 5,479,995 A * | 1/1996 | Falgout, Sr. | 175/74 |
| 5,495,901 A | 3/1996 | Livingstone | |

(Continued)

FOREIGN PATENT DOCUMENTS

| CA | 2025653 A1 | 3/1992 |
|---|---|---|
| CA | 2472639 A1 | 7/2005 |

*Primary Examiner* — James Hook
(74) *Attorney, Agent, or Firm* — Christensen O'Connor Johnson Kindness PLLC

(57) ABSTRACT

An adjustable bent housing includes an outer tubular member having an interior surface defining an interior bore. The outer tubular member has a first angular offset. An inner tubular member is provided and has an exterior surface. The inner tubular member has a second angular offset. The inner tubular member has at least one engagement end received within the interior bore of the outer tubular member. A desired cumulative angular offset is selected by relative rotation of the outer tubular member and the inner tubular member to adjust the positioning of the first angular offset relative to the second angular offset. A rotational stop is provided that limits relative rotation of the outer tubular member and the inner tubular member to a limited rotational range. A locking sleeve locks the outer tubular member and the inner tubular member in a selected rotational position to fix the cumulative angular offset.

7 Claims, 4 Drawing Sheets

U.S. PATENT DOCUMENTS

| | | |
|---|---|---|
| 6,244,345 B1 | 6/2001 | Helms |
| 6,543,554 B2 | 4/2003 | Smith |
| 6,550,818 B2 | 4/2003 | Robin |
| 6,554,083 B1 | 4/2003 | Kerstetter |
| 6,799,646 B1 | 10/2004 | Daigle |
| 6,854,486 B2 * | 2/2005 | Challender .................. 138/109 |
| 6,945,338 B1 | 9/2005 | Defourny |
| 7,111,678 B2 | 9/2006 | McElroy |
| 7,661,488 B2 * | 2/2010 | Andoskin et al. ............... 175/74 |
| 2004/0094309 A1 * | 5/2004 | Maguire ...................... 166/381 |

* cited by examiner

SECTION A-A

SECTION A'-A'

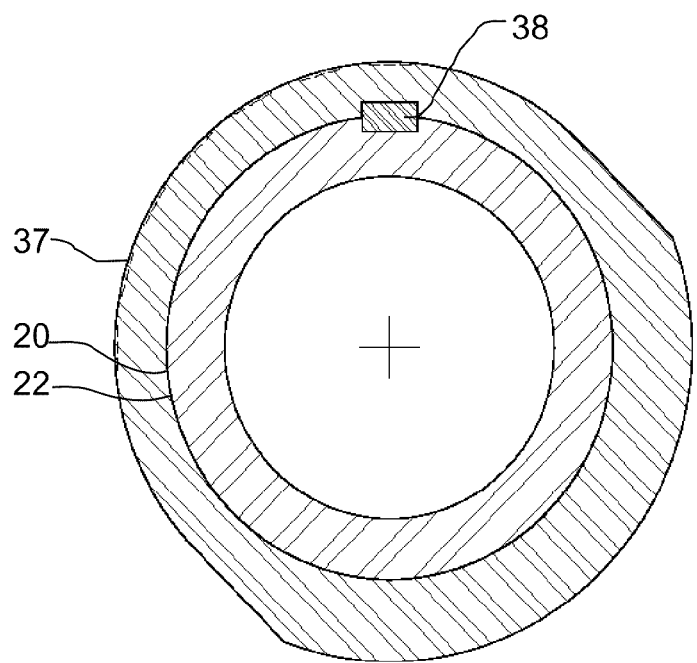
SECTION B-B
FIG. 5
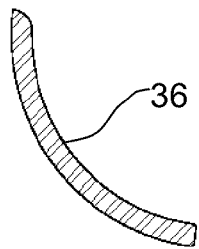
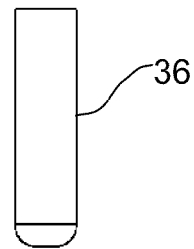
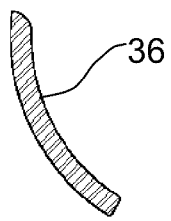
FIG. 6  FIG. 7  FIG. 8

ADJUSTABLE BENT HOUSING WITH ROTATIONAL STOP

FIELD

The present patent relates to an adjustable bent housing having two rotationally adjustable pipe sections with a rotational stop to limit relative rotation.

BACKGROUND

An adjustable bent housing is comprised of two pipe sections, each of which has an angular offset. Adjustment to a selected angular offset is achieved by relative rotation of the two pipe sections. If each of the two pipe sections has an angular offset of 1.5 degrees, the angular offsets can be positioned to cancel each other out at zero degrees, to create a maximum cumulative offset of 3 degrees, or to create an intermediate offset somewhere between 0 and 3 degrees. Problems have been occurring with the two pipe sections separating down hole.

SUMMARY

There is provided an adjustable bent housing, comprising an outer tubular member having an interior surface defining an interior bore. The outer tubular member has a first angular offset. An inner tubular member is provided and has an exterior surface. The inner tubular member has a second angular offset. The inner tubular member has at least one engagement end received within the interior bore of the outer tubular member. A desired cumulative angular offset is selected by relative rotation of the outer tubular member and the inner tubular member to adjust the positioning of the first angular offset relative to the second angular offset. A rotational stop is provided that limits relative rotation of the outer tubular member and the inner tubular member to a limited rotational range. Means are provided for locking the outer tubular member and the inner tubular member in a selected rotational position with the rotational range to fix the cumulative angular offset.

BRIEF DESCRIPTION OF THE DRAWINGS

These and other features will become more apparent from the following description in which reference is made to the appended drawings, the drawings are for the purpose of illustration only and are not intended to in any way limit the scope of the invention to the particular embodiment or embodiments shown, wherein:

FIG. 5 is an end elevation view in section of the adjustable bent housing in FIG. 1 along line B-B.

FIG. 6 is a side elevation view of an adjustment limiter.

FIG. 7 is a top plan view of the adjustment limiter of FIG. 6.

FIG. 8 is a side elevation view of an alternative adjustment limiter.

DETAILED DESCRIPTION

Figure 1:
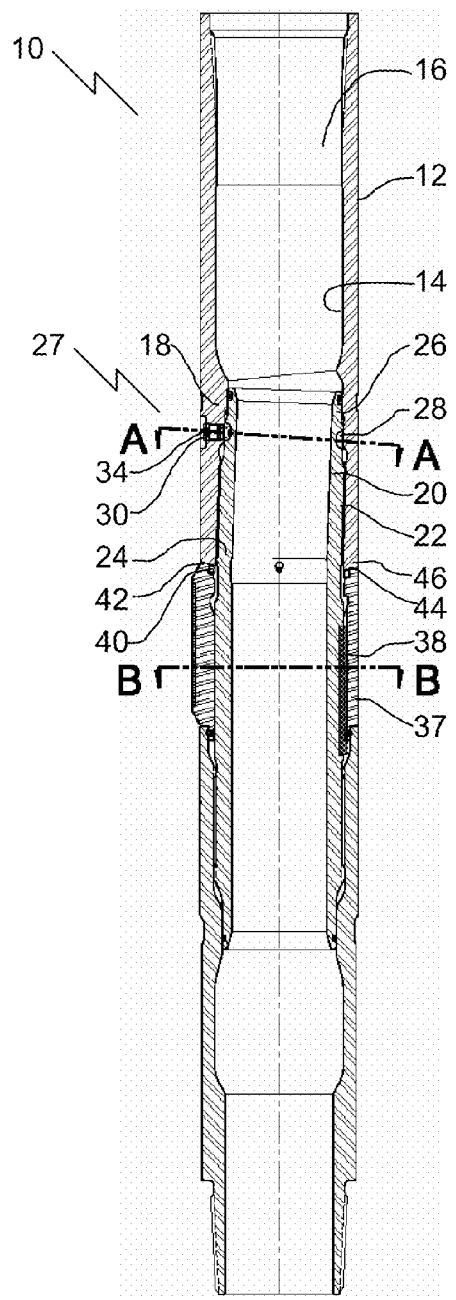
FIG. 1 is a side elevation view of an adjustable bent housing in a straight position.

An adjustable bent housing generally identified by reference numeral 10, will now be described with reference to FIG. 1 through 9.

Figure 2:
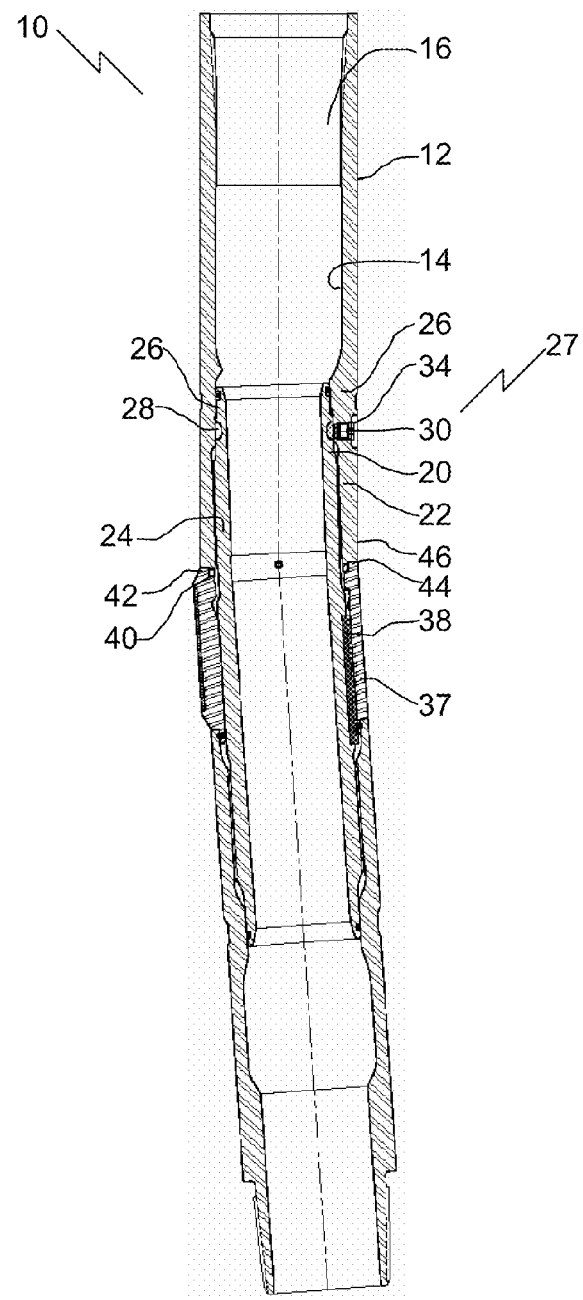
FIG. 2 is a side elevation view of the adjustable bent housing in a bent position shown in FIG. 1.

Structure and Relationship of Parts:

Referring to FIG. 1, adjustable bent housing 10 has an outer tubular member 12 having an interior surface 14 defining an interior bore 16 and a first angular offset 18. As shown, first angular offset 18 is an angled portion of interior surface 14. An inner tubular member 20 is provided with an exterior surface 22 and a second angular offset 24. As shown, second angular offset 24 is a bend in inner tubular member 20. Inner tubular member 20 has an engagement end 26 received within interior bore 16 of outer tubular member 12. Referring to FIG. 2, a desired cumulative angular offset is selected by relative rotation of outer tubular member 12 and inner tubular member 20 to adjust the positioning of first angular offset 18 relative to second angular offset 24.

Figure 3:
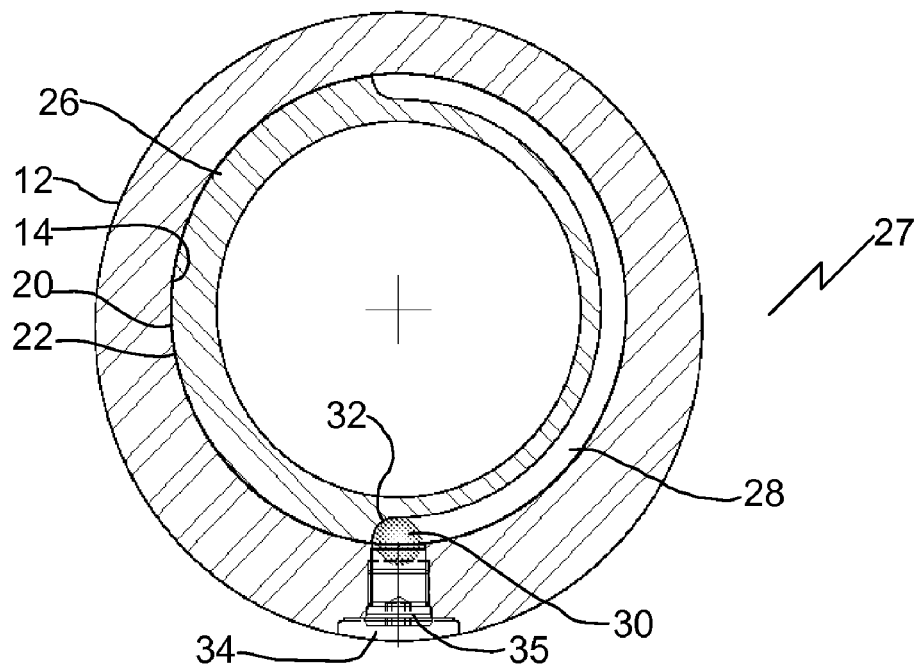
FIG. 3 is an end elevation view in section of the adjustable bent housing in FIG. 1 along line A-A.

Referring to FIG. 3, there is provided a rotational stop generally indicated by reference numeral 27 that limits relative rotation of outer tubular member 12 and inner tubular member 20 to a limited rotational range. As shown, rotational stop 27 includes an arcuate track 28 on exterior surface 22 of inner tubular member 20 and a track follower 30 tending inwardly from interior surface 14 of outer tubular member 12. Rotation in one direction is stopped when track follower 30 reaches a remote end 32 of track 28. Preferably, a radial bore 34 is provided in outer tubular member 12 to facilitate track follower 30 being inserted into radial bore 34 and engaging track 28 after engagement of engagement end 26 of inner tubular member 20 with outer tubular member 12 as shown in FIGS. 1 and 2. It will be apparent that other designs for track 28 and track follower 30 may also be possible. For example, track 28 may be on either interior surface 14 of outer tubular member 12, or exterior surface 22 of inner tubular member 20, with track follower 30 on the opposite surface.

Figure 4:
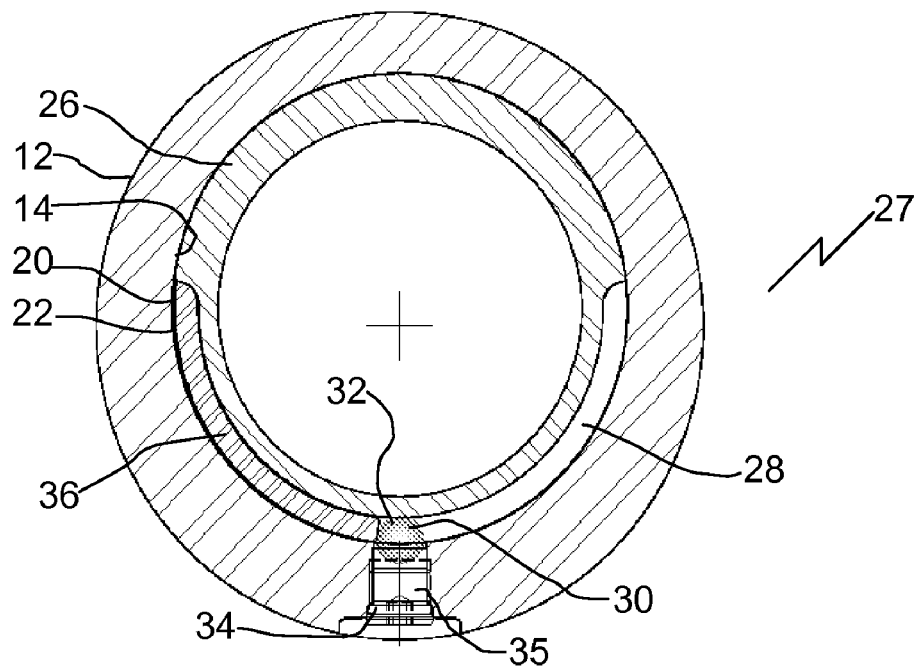
FIG. 4 is an alternate end elevation view in section of the adjustable bent housing in FIG. 1 along line A-A with an additional adjustment limiter inserted.

Referring to FIG. 4, an arcuate shim 36 may be positioned in arcuate track 28 to prevent movement of track follower 30 along track 28. This further limits the selected rotational range and thus limits the cumulative angular offset to a narrower range of adjustment positions. Referring to FIGS. 6 and 8, shim 36 may have various sizes to select a desired range of motion. Referring to FIG. 7, shim 36 is narrow enough to fit within track 28.

Figure 9:
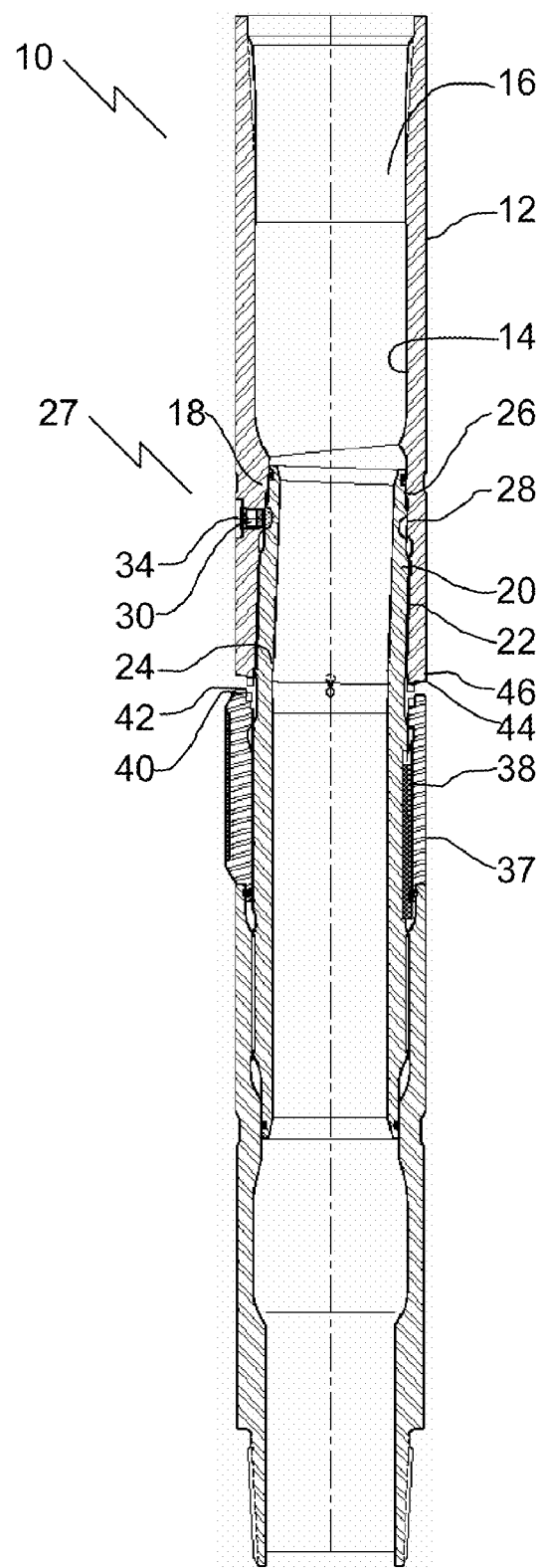
FIG. 9 is a side elevation view in section of the adjustable bent housing in FIG. 1 in a rotatable position.

Referring to FIG. 5, a locking sleeve 37 is provided that is axially movable along, and non-rotationally secured to, inner tubular member 20 by engagement spline 38. Referring to FIG. 9, relative movement of outer and inner tubular members 12 and 20 is either permitted or prevented by a clutch engagement 40 at a remote end 42 of locking sleeve 37 that engages and disengages a clutch engagement 44 at a first end 46 of outer tubular member 12 to prevent relative rotation of outer tubular member 12 and inner tubular member 20. As depicted, clutch engagements 40 and 44 are sets of interlocking teeth, and the faces near clutch engagements 40 and 44 have an angular offset that correspond to angular offsets 18 and 24. In the engaged position shown in FIG. 1, the cumulative angular offset is fixed. In the disengaged position shown in FIG. 9, the cumulative angular offset is adjustable. Other means of locking and unlocking outer tubular member 12 and inner tubular member 20 may also be used, as will be recognized by those skilled in the art.

Operation:

Referring to FIG. 1, adjustable bent housing 10 is prepared as described above. Inner tubular member 20 is inserted into outer tubular member 12. Track follower 30 is inserted through radial bore 34, which is then plugged by a plug 35 such that it engages track 28 and limits rotation, such that components cannot be separated during adjustment. Referring to FIG. 9, when it is desired to change the angular offset between inner tubular member 20 and outer tubular member 12, locking sleeve 37 is moved such that clutch engagements 40 and 44 become disengaged. Outer and inner tubular members 12 and 20 are then able to be rotated relative to each other within the permitted range of rotation as track follower 30 moves within track 28. Referring to FIG. 2, once the desired angular offset is selected, locking sleeve 37 is moved again such that clutch engagements 40 and 44 are engaged to fix the desired angular offset. As an option, the range of possible angular offsets may be reduced by inserting arcuate shim 36 as shown in FIG. 4. Arcuate shim 36 may have different sizes, depending on the limit that is desired, as represented by FIG. 6 and 8.

Advantages:

With the adjustable bent housing, as described above, the rotational stop prevents the components of the adjustable bent housing from being separated down hole in the event a careless rig crew has left the components too loose. The rotational stop ensures inner tubular member 20 stays in the optimum position relative to outer tubular member 12. As further protection against abuse by a careless rig crew, the arcuate shims can be inserted to limit the degrees of cumulative offset, in order to prevent, for example, a three degree offset from being used in applications where a two degree offset is the maximum recommended for formation conditions.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiments without departing from scope of the Claims.

What is claimed is:

1. An adjustable bent housing, comprising:
    an outer tubular member having an interior surface defining an interior bore, the outer tubular member having a first angular offset;
    an inner tubular member having an exterior surface, the inner tubular member having a second angular offset, the inner tubular member having at least one engagement end received within the interior bore of the outer tubular member, a desired cumulative angular offset being selected by relative rotation of the outer tubular member and the inner tubular member to adjust the positioning of the first angular offset relative to the second angular offset;
    a rotational stop limiting relative rotation of the outer tubular member and the inner tubular member to a limited rotational range; and
    a rotational lock for locking the outer tubular member and the inner tubular member in a selected rotational position within the rotational range to set the cumulative angular offset.

2. The adjustable bent housing of claim 1, the rotational stop comprising:
    an arcuate track on one of the interior surface of the outer tubular member or the exterior surface of the inner tubular member, the track having a remote end; and
    a track follower on another of the interior surface of the outer tubular member or the exterior surface of the inner tubular member, rotation in one rotational direction being stopped when the track follower reaches the remote end of the track.

3. The adjustable bent housing of claim 2, wherein an arcuate shim is positioned in the arcuate track to prevent movement of the track follower along the track and further limit the selected rotational range to thereby limit the cumulative angular offset to a narrower range of adjustment positions.

4. The adjustable bent housing of claim 2, wherein the arcuate track is on the exterior surface of the inner tubular member and the track follower extends inwardly from the interior surface of the outer tubular member.

5. The adjustable bent housing of claim 4, wherein a radial bore is provided in the outer tubular member to facilitate the track follower being inserted into the radial bore to engage the track after engagement of the engagement end of the inner tubular member with the outer tubular member.

6. The adjustable bent housing of claim 1, wherein the rotational lock for locking the outer tubular member and the inner tubular member in a selected rotational position comprises a locking sleeve axially movable along and non-rotationally secured to the inner tubular member by engagement spline, a clutch engagement at a remote end of the locking sleeve engaging a clutch engagement at a first end of the outer tubular member to prevent relative rotation of the outer tubular member and the inner tubular member.

7. An adjustable bent housing, comprising:
    an outer tubular member having an interior surface defining an interior bore, the outer tubular member having a first angular offset;
    an inner tubular member having an exterior surface, the inner tubular member having a second angular offset, the inner tubular member having at least one engagement end received within the interior bore of the outer tubular member, a desired cumulative angular offset being selected by relative rotation of the outer tubular member and the inner tubular member to adjust the positioning of the first angular offset relative to the second angular offset;
    a rotational stop limiting relative rotation of the outer tubular member and the inner tubular member to a limited rotational range, the rotational stop comprising:
        an arcuate track on the exterior surface of the inner tubular member, the track having a remote end; and
        a track follower extending inwardly from the interior surface of the outer tubular member, rotation in one rotational direction being stopped when the track follower reaches the remote end of the track, a radial bore being provided in the outer tubular member to facilitate the track follower being inserted into the radial bore to engage the track after engagement of the engagement end of the inner tubular member with the outer tubular member;
    an arcuate shim positioned in the arcuate track to prevent movement of the track follower along the track and further limit the selected rotational range to thereby limit the cumulative angular offset to a narrower range of adjustment positions; and
    a locking sleeve axially movable along and non-rotationally secured to the inner tubular member by engagement spline, a clutch engagement at a remote end of the locking sleeve engaging a clutch engagement at a first end of the outer tubular member to prevent relative rotation of the outer tubular member and the inner tubular member to set the cumulative angular offset.

* * * * *